(12) United States Patent
Hudson

(10) Patent No.: US 6,514,061 B1
(45) Date of Patent: Feb. 4, 2003

(54) POSITIONING FIXTURE FOR A ROTARY MOLD

(76) Inventor: Kenneth C. Hudson, 10845 Forest Run Dr., Bradenton, FL (US) 34202

(*) Notice: Subject to any disclaimer, the term of this patent is extended or adjusted under 35 U.S.C. 154(b) by 356 days.

(21) Appl. No.: 09/631,430

(22) Filed: Aug. 3, 2000

(51) Int. Cl.$^7$ .............................................. B29C 41/04
(52) U.S. Cl. ......................... 425/62; 425/182; 425/435; 425/DIG. 238
(58) Field of Search .......................... 425/62, 182, 195, 425/435, DIG. 238

(56) References Cited

U.S. PATENT DOCUMENTS

| | | | |
|---|---|---|---|
| 3,416,193 A | * 12/1968 | Freeborn | ..................... 425/143 |
| 4,247,279 A | 1/1981 | Masters | |
| 4,354,819 A | 10/1982 | Wirz | |
| 4,360,334 A | 11/1982 | Kiefer | |
| 4,632,654 A | 12/1986 | Lemelson | |
| 4,767,299 A | 8/1988 | Friesen | |
| 5,028,230 A | 7/1991 | Hunter | |
| 5,039,297 A | 8/1991 | Masters | |
| 5,221,539 A | * 6/1993 | Pallerberg et al. | .......... 264/302 |
| 5,238,379 A | * 8/1993 | Payne | ......................... 425/135 |
| 5,458,844 A | 10/1995 | MacDougall | |

FOREIGN PATENT DOCUMENTS

SU          389982      12/1973

* cited by examiner

Primary Examiner—James P. Mackey

(57) ABSTRACT

A positioning fixture for a rotary mold provides both rotation and lifting for a mold installed therein. The present fixture is adapted particularly for relatively large molds, as used in the forming of hulls and other large structures for relatively large boats and the like. The positioning fixture basically comprises a frame with an upright at each end, with the mold structure extending between the two uprights. A drive motor is provided to rotate the mold between the two uprights, as desired. In addition to the drive motor, a lift strut or cylinder installed at one end of the device and communicating with the opposite end by a tension member (belt, chain, etc.) lifts both of the mold rotating pins or mechanisms simultaneously. A safety latch or catch is installed at each end of the device, to preclude accidental dropping or falling of the mold when lifted. The rotating motor and lift strut are preferably hydraulic units, which may receive hydraulic pressure and flow from a pump which is in turn powered by a conventional shop air supply. Other power systems (electrical, electrical/hydraulic, etc.) may be used in environments where electrical arcing or discharge is not a concern. The present positioning fixture greatly reduces the need for manual labor and additional equipment (fork lifts, cranes, etc.) in handling such large, heavy, and bulky molds, and enables the mold to be positioned by a single individual for convenient placement for working, inversion for clean storage, etc. as necessary.

20 Claims, 6 Drawing Sheets

POSITIONING FIXTURE FOR A ROTARY MOLD

BACKGROUND OF THE INVENTION

1. Field of the Invention

The present invention relates generally to methods and apparatus for casting or forming various structures, and more specifically to a fixture providing for both elevation and rotation of a mold. The present fixture is adapted particularly for handling relatively large molds, as used in the forming of boat hulls, decks, and other large components formed of glass fiber and/or similar materials.

2. Description of the Related Art

The invention of methods of forming fine strands of glass fiber and other fine synthetic fibrous materials, means of weaving such materials to form sheets of cloth, and various resins for impregnating such materials to form composite structures, has led to a myriad of different products which were previously formed of other materials. For example, traditionally boats have been constructed of wood, and later riveted and/or welded sheet metal for recreational boats and the like. The development of glass fiber structures made rigid by impregnating with resins and curing, has greatly simplified the construction of such structures and reduced the hours of labor previously required.

Nevertheless, the use of glass and/or other fibers for forming large structures requires a significant amount of specialized equipment, in the form of molds for the hull and other large components, resin mixing equipment, large clean areas for laying out and cutting the glass fiber cloth, etc. Probably the most cumbersome piece of equipment is the mold itself for the boat hull, which is the largest single component of such a craft. Such molds are quite heavy, due to the need for rigidity to form a precisely shaped and dimensioned hull. As a result, they are quite difficult to manipulate, with a number of workers and/or fork lifts, cranes, etc. being required to handle such molds.

Yet, frequent handling is a requirement with such molds, as they typically must be positioned or oriented for access by workers for the layups of glass fiber or other synthetic cloth and resin which are used to form the structure. Such molds are generally rotated or tilted to one side to provide for ease of access for layups along that side of the hull, and then rotated back to the opposite side to facilitate layups on that side. Also, it is critical that the mold be kept very clean, in order to provide the smoothness desired for the completed hull and to preclude contamination of the materials used for the structure. Accordingly, such molds are often stored in an inverted position when not in use. The raising and lowering of such molds is also frequently required, for ease of access to the interior by workers and to provide clearance for rotating the mold from one to another working position or for inversion for storage.

Heretofore, such rotating, lifting, and lowering of relatively large molds was often done by means of cranes and/or fork lifts, using heavy straps and a considerable amount of muscle power by several workers. While some devices have been developed to assist in the movement and orientation of such relatively large molds, none, to the knowledge of the present inventor, provides for complete powered rotation of a large mold as well as providing for powered lifting and lowering of the mold. The present invention responds to this need by providing the above functions, thereby greatly reducing the need for additional equipment in the form of cranes, hoists, lifts, etc., and also greatly reducing the manpower which might otherwise be required for the lifting and/or rotation of a large, heavy mold structure and thereby greatly increasing safety for such workers. A discussion of the related art of which the present inventor is aware, and its differences and distinctions from the present invention, is provided below.

U.S. Pat. No. 4,247,279 issued on Jan. 27, 1981 to William E. Masters, titled "Rotational Molding System," describes an apparatus providing periodic heating of two separate molds during curing operations. The molds are on a track which passes through the curing oven, and are alternatingly installed in the oven from opposite ends. Masters also provides a remotely powered system for rocking the molds about their lateral axes, and for rotating the molds about their longitudinal axes. However, Masters does not provide any means of elevating his molds, as provided by the present fixture.

U.S. Pat. No. 4,354,819 issued on Oct. 19, 1982 to Jakob Wirz, titled "Multi-Pivotable Mold Carrier Clamping Apparatus," describes a relatively small clamp table for holding a mold. The Wirz mold carrier has no wheels or casters, and is relatively immobile compared to the present fixture with its wheels which provide a degree of mobility. The two clamp faces are flat plates, precluding placement of a large mold structure having an irregular configuration, such as a large boat hull. While the Wirz device provides for lifting and rotation of the mold held therein, the rotation is about a vertical axis, rather than about a horizontal, longitudinal axis of the mold carried therein, as provided by the present fixture.

U.S. Pat. No. 4,360,334 issued on Nov. 23, 1982 to Gunther Kiefer, titled "Thermoforming Machine," describes a machine having three separate compartments for containing a plastic sheet therein, heating the sheet to soften the plastic, and introducing pressure into the mold to form the plastic sheet according to the interior shape of the mold. This process is accomplished via three separate molds and stations, with each handling one of the steps in the process. The forming station provides for elevating the mold for clearance for a deep draw mold. However, Kiefer does not rotate a single mold generally through its longitudinal axis, nor does he provide for elevating the mold by means of a single hydraulic or other powered strut or cylinder, as provided by the present positioning fixture invention.

U.S. Pat. No. 4,632,654 issued on Dec. 30, 1986 to Jerome H. Lemelson, titled "Rotational Molding Apparatus," describes an apparatus more closely resembling the rotational molding system of the '279 U.S. patent to Masters, discussed further above, than the present invention. Lemelson provides only a single mold carriage structure through the heating oven, rather than the two carriages of Masters. However, the same points of distinction between the Masters apparatus and the present invention, i. e., the lack of any elevating means, also apply to the apparatus of the Lemelson '654 U.S. patent in comparison to the present positioning fixture invention.

U.S. Pat. No. 4,767,299 issued on Aug. 30, 1988 to Peter Friesen, titled "Rotational Molding Machine," describes an oven for heating thermoplastic materials during the molding process. The oven contains a rotary drive mechanism providing rotation about two mutually perpendicular axes, unlike the single longitudinal axis provided by the present positioning fixture. It is also noted that Friesen does not provide any means of elevating the mold, either within or without the oven, whereas the present fixture allows the mold to be elevated and lowered as desired to facilitate access thereto. Moreover, the Friesen mold is relatively fixed, whereas the present positioning fixture is relatively mobile, with its wheeled frame.

U.S. Pat. No. 5,028,230 issued on Jul. 2, 1991 to Gordon S. Hunter, titled "Machine For Handling Molds In Injection Molding," describes an apparatus having two opposed mold attachment faces at opposite ends thereof. Both are arcuately translatable so the faces are horizontal, for cleaning and other work. One face is horizontally movable relative to the other, to adjust the spacing therebetween. However, the rotating axes of the Hunter machine are not horizontally disposed and concentric with one another, and thus cannot rotate a single, fixed object therebetween, as provided by the present positioning fixture. Moreover, Hunter does not provide any means of elevating or lowering a mold held within his machine, nor does he provide any means of mobility for the machine, which features are a part of the present invention.

U.S. Pat. No. 5,039,297 issued on Aug. 13, 1991 to William E. Masters, titled "Rotational Molding Apparatus," describes a molding oven having two different axes of rotation, with the two axes being non-coplanar with one another. The axes provide a pendular or rocking action for the mold, serving to distribute the casting or molding material more evenly. The apparatus of the Masters '297 U.S. patent differs considerably from the present positioning fixture invention, in that Masters encloses the entire mold and much of its mechanism within an oven, unlike the present invention. Also, Masters fails to provide any mobility for his apparatus (in fact, a pit or depression is provided for some of the structure), and does not provide any means for elevating the mold, unlike the present positioning fixture.

U.S. Pat. No. 5,458,844 issued on Oct. 17, 1995 to Gary D. MacDougall, titled "Method Of Rotary Moulding A Shell Structure Having an Integral Support Structure," describes various steps in such a method, using two complementary molds for forming inner and outer shells and sealing the two shells together while the plastic is still in a molten state. MacDougall does not provide any means for manipulating or positioning the molds, whereas the present invention describes only generally a single mold component but describes specifically the means and mechanism for rotating and elevating the single mold as desired.

Finally, Soviet Patent Publication No. 389,982 published on Dec. 13, 1973 to G. P. Markov et al., describes (according to the English abstract) a layup machine for automatically orienting and placing strips or panels of structural fabric onto or into a mold. The device carries a roll of fabric at one side thereof, with gripping means mounted on a track for gripping the free end of the fabric and pulling it out to the desired length or span. The entire mechanism may be turned to orient the weave of the fabric as desired, with the fabric being cut and placed in the mold after orientation and cutting. The Russian Patent Publication fails to disclose any means for rotating or moving the mold, as provided by the present invention. It is also noted that no means for elevating the mold is apparent in the Russian Patent Publication, as provided by the present positioning fixture invention.

None of the above inventions and patents, either singly or in combination, is seen to describe the instant invention as claimed.

SUMMARY OF THE INVENTION

The present invention comprises a positioning fixture for a rotary mold, adapted particularly for relatively large and heavy molds as used for forming hulls and related structures for larger boats and the like. The present positioning fixture comprises a generally horizontal frame with an upright at each end, supporting a hull or other mold between the two uprights. The mold supports are adjustable for height, by means of a single lift strut installed at one end of the device. A link (strap, band, chain, etc.) extends from the lifting mechanism at one end of the frame to the lifting mechanism at the opposite end, enabling the single lift strut to lift both ends of the mold together. Safety latches are provided to preclude accidental dropping of the mold.

The two mold supports are pivotable, with one of the supports powered by a rotary motor separate from the lifting strut. This mechanism enables the mold to be rotated for access to any side or area as desired, and to be lifted and lowered as desired for ease of access to the interior of the mold as necessary. The frame is mounted on wheels or casters for mobility in the shop or factory. The rotation motor may be of any suitable type, such as a hydraulic motor powered by a suitable hydraulic supply (pump, etc.). A pneumatic power supply may be used to supply hydraulic pressure and volume to the motor and strut, with air being supplied to the pneumatic pump by a conventional shop air supply. Alternative power means (electric, pure pneumatic, etc.) may be provided as desired and/or where suitable, depending upon regulatory and other concerns.

Accordingly, it is a principal object of the invention to provide an improved positioning fixture for a rotary mold, for rotating and/or elevating the mold as desired.

It is another object of the invention to provide an improved positioning fixture which is adapted particularly for positioning a relatively large mold, as used in the forming of hulls and other structures for relatively large boats and the like.

It is a further object of the invention to provide an improved positioning fixture including wheels or casters for mobility in the local shop or factory environment.

An additional object of the invention is to provide an improved positioning fixture which rotating and elevating means are hydraulically powered, with a pneumatically powered pump providing hydraulic pressure.

Still another object of the invention is to provide an improved positioning fixture including safety latch means for precluding accidental falling or dropping of the mold and lifting mechanism when elevated.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a positioning fixture for holding and positioning a relatively large rotary mold therein, for manipulating the mold for various operations. The present fixture is particularly well suited for use in handling a relatively large open mold such as used in the forming of boat hulls and other large structures, but may be adapted for use in handling other types of molds as well to preclude any requirement for supplemental equipment and/ or manual labor for changing the position of the mold.

Figure 1:
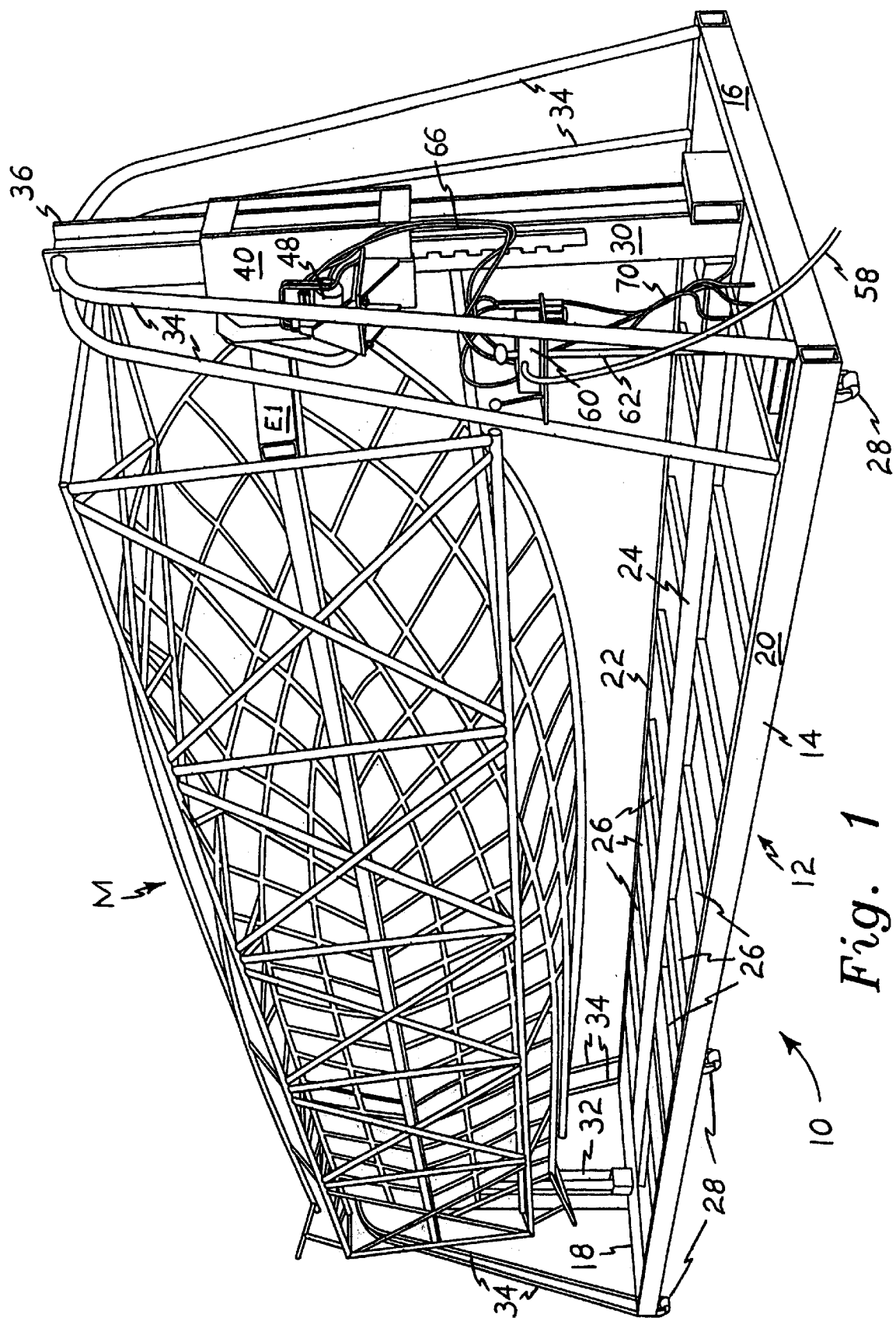
FIG. 1 is a front and right side perspective view of the present positioning fixture, showing its general configuration with a boat hull mold installed therein.

FIG. 1 of the drawings provides an overall general perspective view of the present positioning fixture from the controlling end of the device. The fixture, designated by the reference numeral 10 throughout the drawings, includes therein a mold M for a boat hull. The present fixture 10 essentially comprises a frame 12 formed of a series of steel structural members, with the frame 12 having a substantially horizontal base 14 with opposite first and second ends, respectively 16 and 18. The sides of the base 14 are defined by opposite parallel side members, respectively 20 and 22, with the side members 20 and 22 and end members 16 and 18 defining the periphery of the generally rectangular base structure 14. A central member 24 and a plurality of lateral members 26 complete the base 14 structure of the frame 12. Mobility in the shop environment may be provided for the frame assembly 10 and a mold M installed thereon, by a plurality of wheels or casters 28 beneath the frame base 14.

Uprights 30 and 32 extend generally upwardly respectively from each end 16 and 18 of the base 14, to support the mechanism for manipulating the mold M. These uprights 30 and 32 are also preferably formed of structural steel, as are the components of the base 14. The two uprights 30 and 32 may be formed of I beam or heavy channel material, etc., as necessary to provide the required strength. Each upright 30 and 32 is supported by a series of generally diagonal braces 34, which extend between the periphery of the base structure 14 and the upper ends 36 and 38 respectively of the two uprights 28 and 30.

Figure 2:
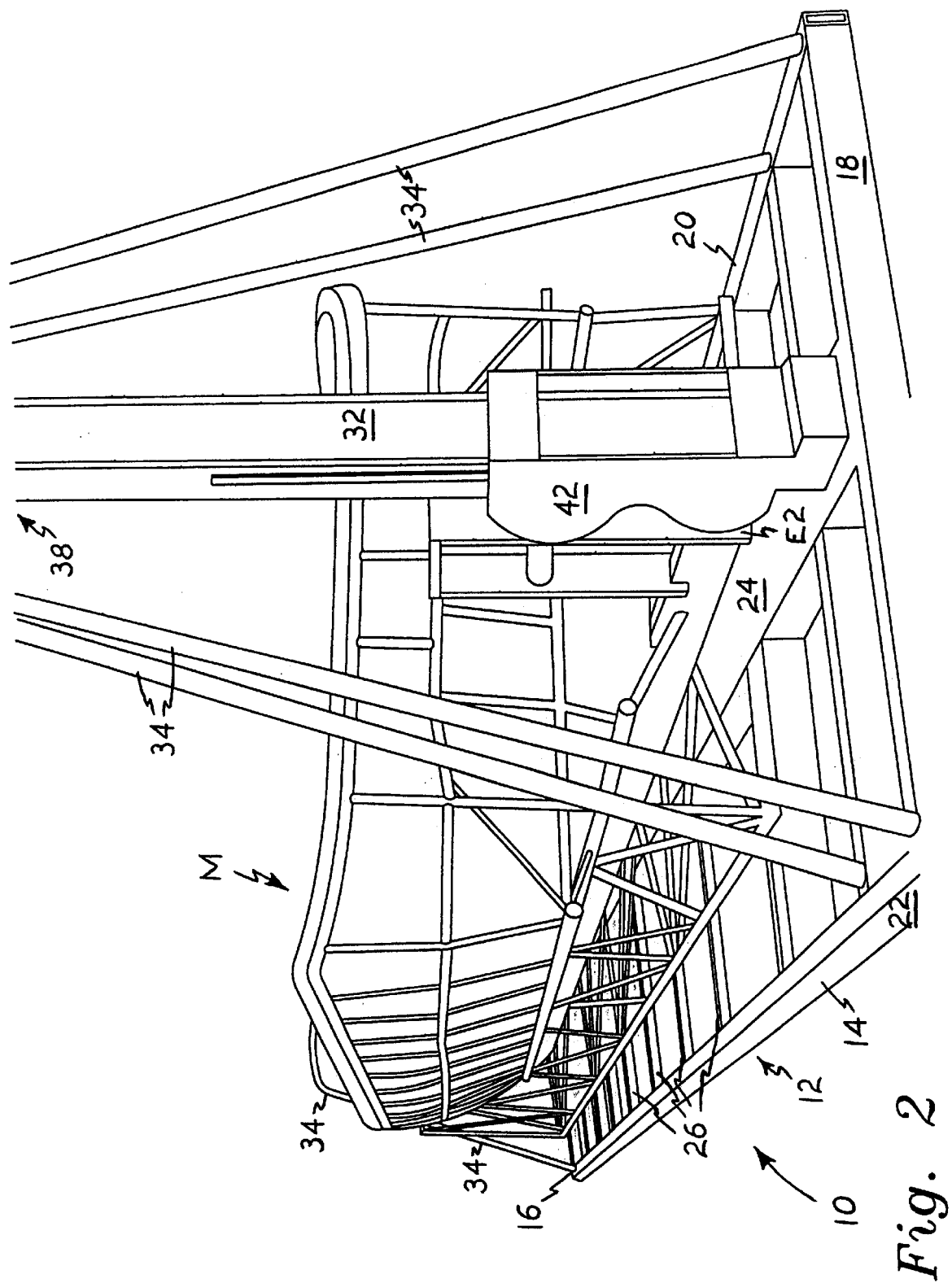
FIG. 2 is a rear perspective view of the positioning fixture of FIG. 1, showing details of the rearward end of the apparatus.
Figure 6:
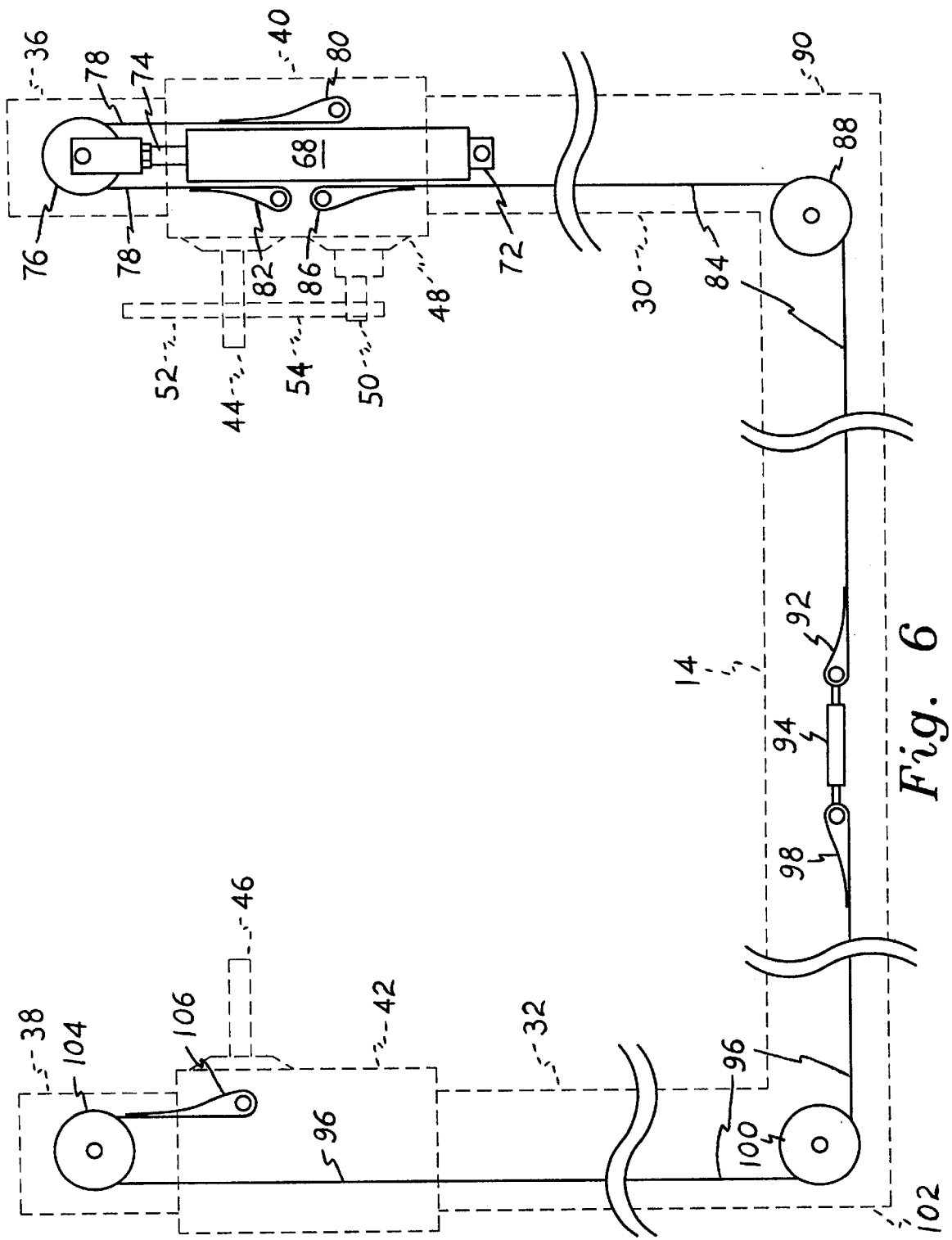
FIG. 6 is a schematic side elevation view showing the lifting mechanism of the present positioning fixture.

Each upright 28 and 30 includes a turning pin carrier, respectively 40 and 42, movably installed thereon; a complete view of the entire arrangement is illustrated schematically in FIG. 6 of the drawings. These turning pin carriers 40 and 42 each have a rotary pin or shaft, respectively 44 and 46, extending generally horizontally therefrom and facing one another to attach respectively to the first and second ends E1 and E2 (shown respectively in FIGS. 1 and 2) of the mold M and to support the mold M therebetween.

The first turning pin carrier 40 includes rotary power means, such as a hydraulically driven motor 48, for rotating the first turning pin 44 and thus the mold M attached thereto about a generally horizontal axis. The motor 48 drives an output shaft and sprocket 50, which in turn drives a larger diameter turning pin sprocket 52 by means of a roller chain 54 (other suitable power transfer means, e. g., gearing, etc., may be used as desired), in order to reduce the rotational speed of the first turning pin or shaft 44. Details of this arrangement are shown in the perspective view of FIG. 3, and schematically in FIG. 6 of the drawings. While other forms of rotary power may be used as desired (e. g., electric, pneumatic, etc.), the use of hydraulic power is desirable in many shop and plant environments due to the lack of electrical power which could provide an ignition source for various flammable chemicals (solvents, etc.), which may be used in the casting or forming of composite structures using various synthetic fibers and resins.

While hydraulic pressure and flow for the hydraulic motor 48 (and hydraulic lift strut, discussed further below) may be provided by an electrically powered hydraulic pump, a pneumatically powered hydraulic pump 56 (shown in FIG. 3) is preferably used, again to obviate any electrical ignition source. The combination pneumatic motor and hydraulic pump 56 may be provided as an integral unit, with pneumatic pressure and flow being provided by a conventional pneumatic system as is generally found in shops, plants, and other industrial environments. A single air line 58 (FIG. 1) is provided from the source of air pressure to a connection near the hydraulic control system 60, with an intermediate air line 62 extending from the connecting fitting to the pneumatic/hydraulic pump 56. A hydraulic power output line 64 extends from the output side of the pneumatic/ hydraulic pump 56 to the hydraulic controller 60, with a pair of rotary motor hydraulic lines 66 extending from the control system 60 to the rotary hydraulic motor 48 which powers the first turning pin 44. As the controller 60 is a double gated valve, the motor 48 may be turned in either direction to rotate the turning pin 44 and attached mold M in either direction as desired.

Figure 4:
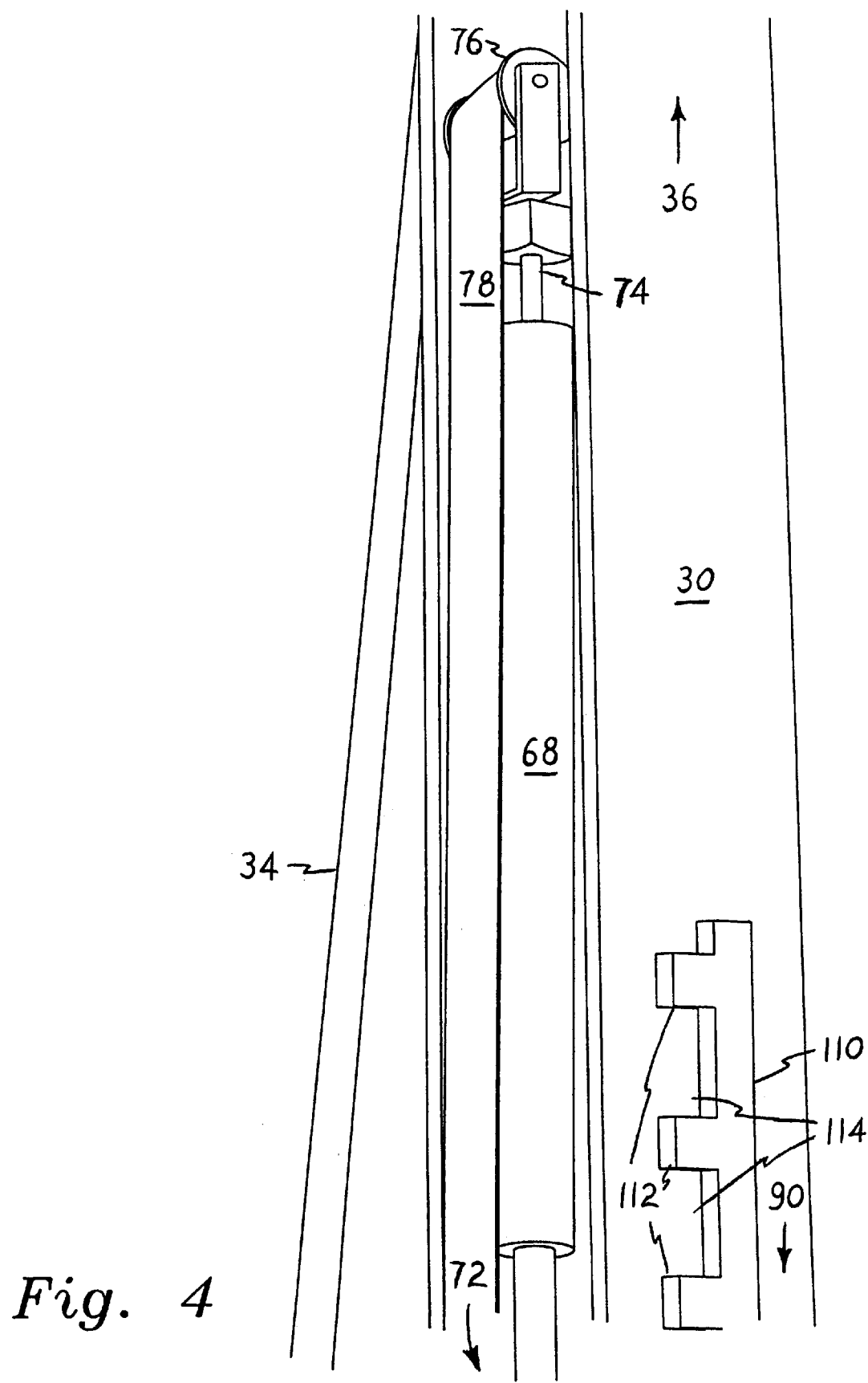
FIG. 4 is a detailed perspective view of the lift cylinder or strut mechanism of the present positioning fixture.

The hydraulic system of the present positioning fixture 10 also provides for the lifting of the mold M between the two uprights or supports 30 and 32 by means of a single hydraulic strut 68 disposed within the first upright 30, as shown in the detail view of FIG. 4 and schematically in FIG. 6 of the drawings. Again, other lifting means (e. g., electrically powered screw jack, etc.) may be provided if desired.

Figure 3:
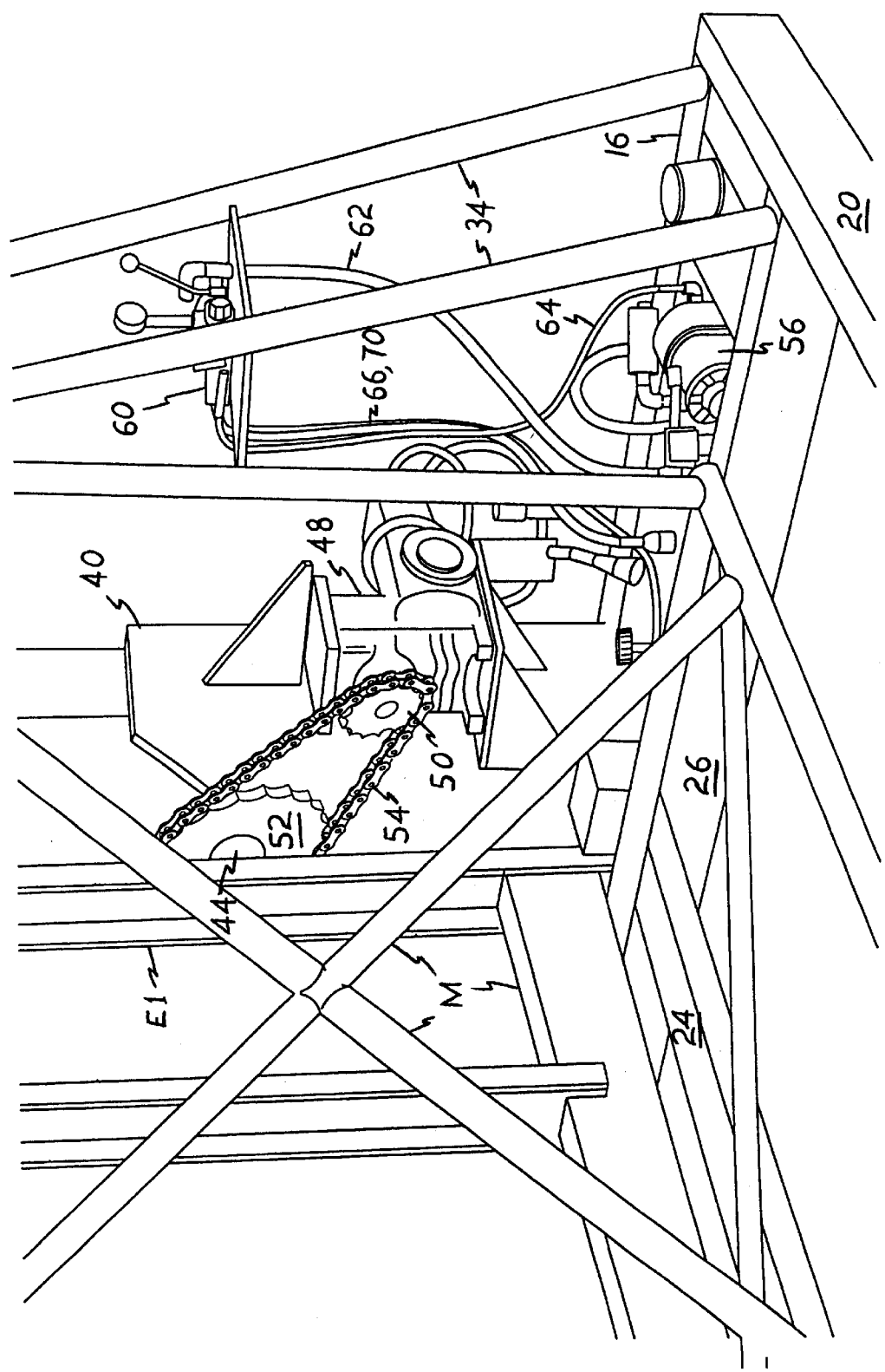
FIG. 3 is a detailed perspective view of the power and rotating means of the present positioning fixture.

The hydraulic cylinder or strut 68 receives hydraulic pressure and flow from the controller 60 by means of a pair of hydraulic lift lines 70 (shown in FIGS. 1 and 3, with the lines 70 grouped with the rotary motor supply lines 66 in FIG. 3 due to the lowered position of the first turning pin carrier 40 and its associated hydraulic motor 48). The hydraulic cylinder or strut 68 has a lower end 72 affixed to the first upright 30, and an opposite relatively free piston or upper end 74 having a first pulley or sheave 76 extending therefrom. A first tension member length 78 has a fixed first end 80 secured immovably to the first upright column 30, and passes over the upper first sheave 76 to secure to the first turning pin carrier 40 by means of its second end 82. Thus, when the hydraulic strut 68 is extended to raise the first pulley or sheave 76, the lifting of the central portion of the first tension member length 78 also lifts its second end 82, and thus also lifts the first turning pin carrier 40 to lift the first end E1 of the mold M secured thereto.

A second tension member length 84 has a first end 86 affixed to the first turning pin carrier 40 and extends downwardly to pass around a second sheath or pulley 88 at the lower end 90 of the first upright or column 30, and thence generally horizontally along the length of the frame base 14. The second tension member length 84 may continue as an unbroken length to terminate at a connection to the second turning pin carrier 42, but preferably has a second end 92 disposed generally medially along the frame base 14, where it connects to a turnbuckle 94 or other adjusting means.

A third tension member length 96 has a first end 98 connected to the turnbuckle 94 and extends generally horizontally along the frame base 14 and around a third sheave or pulley 100 located at the bottom 102 of the second upright or column 32, whereupon it extends upwardly along the column 32 to the upper end 38 thereof. A fourth pulley or sheave 104 is affixed at the upper end 38 of the second upright column 32, with the third tension member length extending over that third sheave 104 and then downwardly, where its second end 106 is affixed to the second turning pin carrier 42.

Extension of the lifting strut 68 results in the raising of the intermediate portion of the first tension member segment or length 78, and the lifting of the first turning pin carrier 40, as described further above. As the first end 86 of the second tension member segment 84 is also affixed to the first turning pin carrier 40, this results in the lifting of the second end 86 of the second tension member segment 84, thus drawing the central portion of this member 84 from left to right as viewed in the schematic drawing of FIG. 6. This draws the portion of the third tension member 84 downwardly along the second upright 32, with the direction of travel of the third tension member segment 84 reversing as it travels over the fourth sheave 104 to draw the second end 106 of the third tension member segment 96, and its attached second turning pin carrier 42, upwardly simultaneously with the lifting of the first carrier 40. Lowering the upper end 74 of the cylinder 68 reverses the motion of the tension member lengths 78, 84, and 96 to allow the two turning pin carriers 40 and 42 to lower simultaneously.

As all of the pulleys or sheaves are simple wheels, as opposed to compound devices, the distance traveled by any of the tension member segments 78, 84, and 96 is equal to one another during any movement thereof. Thus, both carriers 40 and 42 raise and lower equally and simultaneously whenever the lifting strut or cylinder 68 is activated by means of the control system 60. The tension member lengths or segments 78, 84, and 96 may be formed as a single length of material if so desired, by providing an intermediate attachment to the first turning pin carrier 40 and repositioning the length adjustment means 94 at one or both ends of the device. However, experimentation has resulted in the use of a series of heavy polyester straps for the tension members, with the connecting means illustrated schematically in FIG. 6 working well with such material. It will be understood that alternative materials may be used for the tension member, such as one or more flexible belts of any suitable material, one or more roller chains, etc., as desired.

It will be seen that loss of hydraulic pressure, and/or the breakage of one or more of the tension members, is a possibility with the present fixture 10. This could prove disastrous, given the mass of a relatively large mold M installed therein. The present fixture 10 thus also incorporates safety latches which automatically engage as the two turning pin carriers 40 and 42 are raised. These latches are disposed at each upright 30 and 32, with a first latch assembly 108 being illustrated in FIG. 5 of the drawings. (It is not necessary to illustrate the second latch assembly, as it is identical to the first assembly 108 of FIG. 5.)

Figure 5:
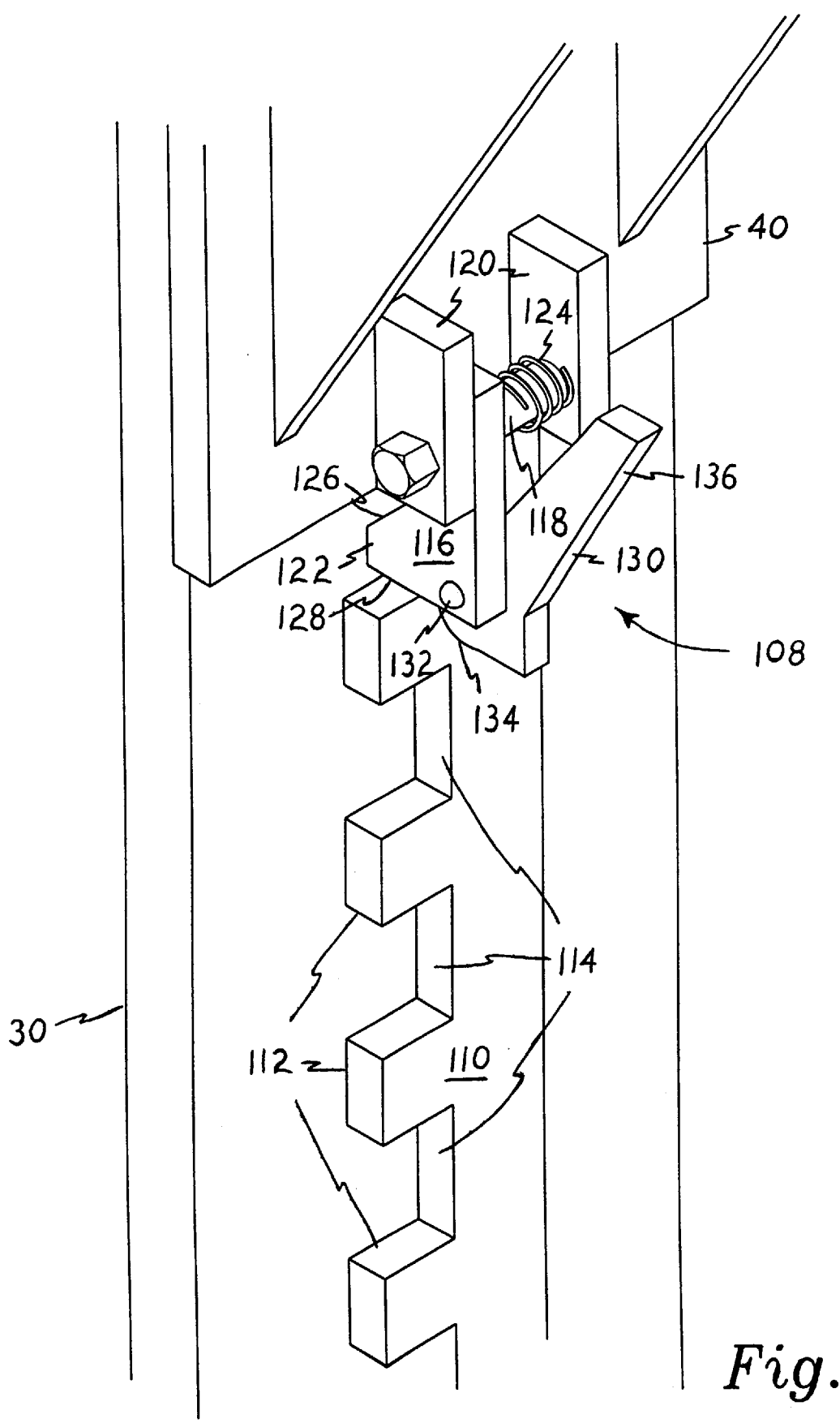
FIG. 5 is a detailed perspective view of the safety latch mechanism disposed beneath the rotating motor of the assembly.

A safety latch rack 110 is affixed to one side of each of the uprights 30 and 32, with a series of alternating, squared off teeth 112 and gaps 114 formed along one side of the rack 110. A dog latch 116 extends from a transverse pin 118, which passes between a pair of lugs 120 which extend from the side of the turning pin carrier, e. g., the carrier 40 as shown in FIG. 5. The dog latch 116 has an engagement end 122 aligned with and urged toward the teeth 112 and gaps 114 of the rack 110 by a spring 124. The dog latch 116 has a sloped upper face 126, which rides over the squared off lower edges of the teeth 112 of the rack 110 as the turning pin carrier 40 is raised. However, the opposite lower face 128 of the dog latch 116 is squared off, and drops into the gap 114 between two of the teeth 112 to engage a corresponding upper face of one of the teeth 112 whenever hydraulic pressure is released in the lifting cylinder to lower the two turning pin carriers 30 and 32.

A release lever 130 serves to release of the dog latch 116. The lower portion of the dog latch 116 has a pin 132 therethrough, from which the release lever 130 extends. The release lever 130 includes a lower cam end 134 bearing against the smooth side of the latch rack 110. A lever arm 136 extends from the release lever 130 opposite the lower cam end. Pulling the arm 136 (when pressure is released on the dog latch 116) levers the lower engagement end 122 of the dog latch 116 clear of the rack 110, allowing the turning pin carrier 40 to descend. This arrangement precludes any need for a person to extend their hand or fingers close to the dog latch engagement face 128 and rack teeth 112, to disengage the latch.

The above described automatic safety locking mechanism 108 holds solidly and securely and cannot be released by manual force, considering the massive weight supported by the engagement face 128 of the dog latch 116. This is desirable, as there should be no way for a person to disengage the safety latches 108 whenever the lifting system is inoperative. The only means for releasing the safety latches 108, is to raise the turning pin carriers 40 and 42 to release pressure on the engagement faces 128 of the dog latches 116, and essentially simultaneously pull the corresponding release lever arms 136 to release the dog latches 116 from their engagement with their respective racks 110. As this requires that the lifting system be operative (or at least that some alternative means of lifting the carriers 40 and 42 and the mold M secured therebetween, be provided), the lifting system serves to support the carriers 40 and 42 and mold M when the latches 116 are not engaged.

In summary, the present positioning fixture provides a much needed means for both rotating a large mold structure, and also for lifting and lowering the mold structure as required for work thereon or therein. The present fixture allows the mold to be raised so that the sides of the mold will clear the underlying surface during rotation, and to be lowered to a convenient working height above the underlying surface once it has been positioned. Mold rotating fixtures of the prior art have not provided such powered means for lifting the mold, with the mold generally remaining at some inconveniently elevated position to provide clearance for rotation.

Using the present positioning fixture, a single operator can position the mold held therein through three hundred sixty degrees of rotation, in either rotational direction as desired. Furthermore, the single operator may raise the mold as desired, for clearance from the underlying structure or to provide a convenient working height, or may lower the mold once it has been rotated as desired to provide convenient access. The present positioning fixture allows a large mold to be worked on in any orientation about its horizontal axis, including the inverted position in order to preclude collection of debris and the like therein.

Work within an object being formed within a mold using the present invention is also safer, due to the ability to lower the mold to close proximity to the underlying surface. This also greatly reduces the requirement for auxiliary equipment (ladders, scaffolding, elevated tool benches, etc.). Moreover, articles formed within a mold using the present fixture, are more easily released by positioning a dolly or the like beneath the mold, and rotating the mold to release the article onto the dolly beneath. This results in a significant saving of time and manpower, is easier on the formed component, and provides a significant increase in safety over other mold release procedures. Accordingly, the present positioning fixture will prove to be a most desirable piece of equipment for those who work with large molds and tooling.

It is to be understood that the present invention is not limited to the sole embodiment described above, but encompasses any and all embodiments within the scope of the following claims.

I claim:

1. A positioning fixture for a rotary mold, comprising:
 a frame having a substantially horizontal base with a first end and a second end opposite said first end;
 a first and a second upright extending substantially vertically respectively from said first and said second end of said base;
 a first and a second turning pin carrier movably secured respectively to said first and said second upright;
 powered rotating means disposed with said first turning pin carrier, for selectively rotating a mold secured between said first and said second turning pin carrier about a substantially horizontal axis; and
 powered lifting means for selectively and substantially equally lifting each said turning pin carrier and the mold secured therebetween.

2. The positioning fixture according to claim 1, wherein:
 said base of said frame comprises a substantially rectangular structure having a periphery and lateral bracing formed of a plurality of steel structural members;
 each said upright comprises a steel structural member having an upper end; and
 said frame includes bracing means extending generally diagonally between said upper end of each said upright and said periphery of said base of said frame.

3. The positioning fixture according to claim 1, further including:
 a plurality of wheels disposed beneath said frame for mobility in the shop and factory environment.

4. The positioning fixture according to claim 1, wherein:
 said powered lifting means comprises a single hydraulic strut disposed with said first upright, for selectively lifting said first turning pin carrier; and
 connecting means extending between said first and said second turning pin carrier, for lifting said second turning pin carrier simultaneously and equally with said first turning pin carrier.

5. The positioning fixture according to claim 4, wherein said connecting means between said first and said second turning pin carrier comprises:
 each said upright having a lower and an upper end;
 said powered lifting means comprises a single hydraulic strut disposed with said first upright;
 said hydraulic strut having a lower end affixed to said first upright, and an upper end opposite said lower end;
 a first sheave disposed at said upper end of said hydraulic strut;
 a second sheave disposed at said lower end of said first upright;
 a third, sheave disposed at said lower end of said second upright;
 a fourth sheave disposed at said upper end of said second upright;
 a tension member having a first end affixed to said first upright and extending upwardly to said first sheave, downwardly to said second sheave, horizontally to said third sheave, upwardly to said fourth sheave, and thence extending downwardly to a second end affixed to said second turning pin carrier, whereby extension of said hydraulic strut pulls upon said tension member and lifts said first and said second turning pin carrier substantially equally and simultaneously.

6. The positioning fixture according to claim 4, wherein:
 said tension member is selected from the group consisting of a series of polyester straps, at least one flexible belt, and at least one roller chain.

7. The positioning fixture according to claim 4, further including:
 a pneumatically powered hydraulic pump; and
 said hydraulic pump providing hydraulic power to said hydraulic strut.

8. The positioning fixture according to claim 1, wherein:
 said powered rotating means comprises a single hydraulic motor.

9. The positioning fixture according to claim 8, further including:
 a pneumatically powered hydraulic pump; and
 said hydraulic pump providing hydraulic power to said hydraulic motor.

10. The positioning fixture according to claim 1, further including:
 safety latch, means at each said upright, for precluding accidental falling of each respective said turning pin carrier.

11. A positioning fixture for a rotary mold and a rotary mold therewith, comprising in combination:
 a positioning fixture frame having a substantially horizontal base with a first end and a second end opposite said first end;
 a first and a second upright extending substantially vertically respectively from said first and said second end of said base;
 a first and a second turning pin carrier movably secured respectively to said first and said second upright;
 a mold having a first end and an opposite second end, secured respectively between said first and said second turning pin carrier;
 powered rotating means disposed with said first turning pin carrier, for selectively rotating said mold about a substantially horizontal axis; and
 powered lifting means for selectively and substantially equally lifting each said turning pin carrier and said mold secured therebetween.

12. The positioning fixture and rotary mold combination according to claim 11, wherein:
 said base of said frame comprises a substantially rectangular structure having a periphery and lateral bracing formed of a plurality of steel structural members;
 each said upright comprises a steel structural member having an upper end; and
 said frame includes bracing means extending generally diagonally between said upper end of each said upright and said periphery of said base of said frame.

13. The positioning fixture and rotary mold combination according to claim 11, further including:
 a plurality of wheels disposed beneath said frame for mobility in the shop and factory environment.

14. The positioning fixture and rotary mold combination according to claim 11, wherein:

said powered lifting means comprises a single hydraulic strut disposed with said first upright, for selectively lifting said first turning pin carrier; and connecting means extending between said first and said second turning pin carrier, for lifting said second turning pin carrier simultaneously and equally with said first turning pin carrier.

15. The positioning fixture and rotary mold combination according to claim 14, wherein said connecting means between said first and said second turning pin carrier comprises:

each said upright having a lower and an upper end;

said powered lifting means comprises a single hydraulic strut disposed with said first upright;

said hydraulic strut having a lower end affixed to said first upright, and an upper end opposite said lower end;

a first sheave disposed at said upper end of said hydraulic strut;

a second sheave disposed at said lower end of said first upright;

a third sheave disposed at said lower end of said second upright;

a fourth sheave disposed at said upper end of said second upright;

a tension member having a first end affixed to said first upright and extending upwardly to said first sheave, downwardly to said second sheave, horizontally to said third sheave, upwardly to said fourth sheave, and thence extending downwardly to a second end affixed to said second turning pin carrier, whereby extension of said hydraulic strut pulls upon said tension member and lifts said first and said second turning pin carrier substantially equally and simultaneously.

16. The positioning fixture and rotary mold combination according to claim 14, wherein:

said tension member is selected from the group consisting of a series of polyester straps, at least one flexible belt, and at least one roller chain.

17. The positioning fixture and rotary mold combination according to claim 14, further including:

a pneumatically powered hydraulic pump; and said hydraulic pump providing hydraulic power to said hydraulic strut.

18. The positioning fixture and rotary mold combination according to claim 11, wherein:

said powered rotating means comprises a single hydraulic motor.

19. The positioning fixture and rotary mold combination according to claim 18, further including:

a pneumatically powered hydraulic pump; and said hydraulic pump providing hydraulic power to said hydraulic motor.

20. The positioning fixture and rotary mold combination according to claim 11, further including:

safety latch means at each said upright, for precluding accidental falling of each respective said turning pin carrier.

* * * * *